US008640315B1

(12) United States Patent
Nikkel

(10) Patent No.: US 8,640,315 B1
(45) Date of Patent: Feb. 4, 2014

(54) ROTATING ADAPTER ASSEMBLY

(76) Inventor: Robert E. Nikkel, Fort Collins, CO (US)

( * ) Notice: Subject to any disclaimer, the term of this patent is extended or adjusted under 35 U.S.C. 154(b) by 904 days.

(21) Appl. No.: 12/607,256

(22) Filed: Oct. 28, 2009

(51) Int. Cl.
*B23P 11/00* (2006.01)
*B21J 15/12* (2006.01)

(52) U.S. Cl.
USPC ............... 29/243.522; 29/243.521; 29/243.53

(58) Field of Classification Search
USPC ...................... 29/243.521, 243.522, 243.523, 29/243.524, 243.525, 243.526, 243.527, 29/243.528, 243.529, 243.53, 243.54, 29/243.55, 34 B, 812.5; 72/391.2, 391.4, 72/391.6
See application file for complete search history.

(56) References Cited

U.S. PATENT DOCUMENTS 3,017,052 A * 1/1962 Kolec ....................... 29/243.521
3,406,557 A * 10/1968 Harris ...................... 29/243.521
3,605,478 A * 9/1971 Chirco ...................... 29/243.529
4,813,261 A 3/1989 Rosier
4,896,522 A 1/1990 Rosier
4,989,442 A * 2/1991 Rosier .......................... 72/391.2
5,036,572 A 8/1991 Rosier
5,050,420 A 9/1991 Liu
5,146,773 A 9/1992 Rosier
5,219,375 A * 6/1993 Kamata et al. ........... 29/243.526
5,771,738 A * 6/1998 Ko ............................... 72/391.8
6,588,246 B2 7/2003 Ko
6,622,363 B2 * 9/2003 Komsta .................... 29/243.525
7,024,741 B2 * 4/2006 Shibata .................... 29/243.529
7,159,290 B1 * 1/2007 Liu .......................... 29/243.523
2008/0179841 A1 7/2008 Chen
2008/0184545 A1 * 8/2008 Cobzaru et al. .......... 29/243.529

* cited by examiner

*Primary Examiner* — Robert Canfield
*Assistant Examiner* — Jessie Fonseca
(74) *Attorney, Agent, or Firm* — Marian J. Furst

(57) ABSTRACT

A rotating adapter for joining an offset, right angle, or other pulling head to a pulling tool. The adapter allows one-handed positioning of a pulling head that is offset, oriented at an angle relative to the tool, or designed to fit into a relatively tight space. The pulling head can be rotated and/or repositioned repeatedly without changing the stroke length of the pulling tool.

12 Claims, 5 Drawing Sheets

ROTATING ADAPTER ASSEMBLY

FIELD OF THE INVENTION

The present invention relates generally to an adapter for connecting a pulling head and a pulling tool for use to install fasteners, and more particularly to an adapter having parts that are rotatable with respect to each other.

BACKGROUND OF THE INVENTION

Fasteners used in aircraft and other industrial applications include blind rivets, blind bolts, lock bolts, and similar fasteners. These fasteners normally are inserted through prepared holes in work pieces that are to be joined to each other and installed in a manner that presses the work pieces together to ensure that there is no relative motion between the work pieces after the fasteners are installed. Generally, these fasteners are installed using a hydraulically activated gun or pulling tool that applies a tensile force to one part of the fastener and a compressive force to another part. A pulling head, operative to transmit both the tensile and compressive forces to a particular type and size of fastener, is attached to the gun or tool.

Often, a single gun or tool can be used with a variety of pulling heads to install a variety of fasteners. An adapter is used to join the pulling head to the tool or gun. Typically, an adapter is a tube or sleeve and an accompanying shaft, with each having screw threads on one end mateable with threads on the tool or gun and screw threads on the other end mateable with threads on the pulling head.

In use, it is often necessary to use an offset head with the pulling axis of the head displaced laterally from but parallel to the pulling axis of the tool, a right angle or other angled head with the pulling axis oriented at an angle other than parallel relative to the tool, or a straight pulling head for special use designed to fit into a relatively tight space. In these cases, the position of the head must be shifted or rotated relative to the tool to place fasteners in different locations, for example, above or below the shoulder of the installer or to one side or the other of the installer. Such repositioning of the pulling head relative to the tool is presently accomplished by loosening the jam nut on the pulling head, then rotating the head, and then locking the jam nut. The threads used to connect the draw bolt of the pulling head to the puller shaft of the adapter usually have a different pitch than the threads used to connect the outer portion of the pulling head to the outer sleeve of the adapter. Thus, each time the head is rotated for use in a different orientation, the positions of the draw bolt and the adapter puller shaft and the positions of the outer portion of the pulling head and the outer sleeve of the adapter are shifted relative to each other along the lengthwise axis of the tool. After a few reorientations, the tool can become inoperative because the relative axial positions of the draw bolt and puller shaft in relation to the axial positions of the outer portion of the head and the outer sleeve of the adapter do not allow the full range of relative axial motion needed to install a fastener. As a result, the pulling head often malfunctions. The position of the draw bold relative to the puller shaft, and the position of the outer portion of the head relative to the outer sleeve of the adapter, usually cannot be detected by looking at the assembled tool and pulling head. If a malfunction occurs, and the tool/head assembly is not damaged, the tool/head assembly must be fully disassembled and then reassembled by the operator, who must insure that all threaded parts are attached properly in accordance with industry standards.

The frequent loosening and tightening of the adapter relative to the pulling tool and the pulling head causes excessive wear on the complete assembly, requiring repairs to or replacement of the pulling tool, the pulling head, or the adapter. Further, repositioning the pulling head relative to the tool takes significant time, which reduces productivity. In addition, workers who use the tools and pulling heads are prone to repetitive use injuries from the frequent repositioning of the pulling head relative to the tool.

Thus, there is a need for an improved adapter that reduces tool wear, decreases the time required for repositioning the pulling head relative to the tool, and reduces the likelihood of repetitive motion injuries to workers using the tool.

SUMMARY OF THE INVENTION

To achieve the foregoing and other objects and in accordance with the purpose of the present invention broadly described herein, one embodiment of this invention comprises an adapter for joining a pulling head to a fastener installation tool, wherein the tool includes an outer portion for applying compressive force and a puller shaft slidable axially and reciprocally within the outer portion for applying tensile force, and the pulling head includes an outer portion for applying compressive force to a workpiece and a draw bolt for applying tensile force to a fastener, with the draw bolt slidable axially and reciprocally over a stroke length within the outer portion. The adapter comprises a sleeve assembly having a proximal portion mateable with the outer portion of the fastener installation tool and a distal portion mateable with the outer portion of the pulling head. The adapter also comprises a puller shaft assembly having a proximal portion mateable with the puller shaft of the fastener installation tool and a distal portion mateable with the draw bolt of the pulling head. The sleeve assembly and the puller shaft assembly share an axis, and the puller shaft assembly is slidable reciprocally along the axis within and relative to the sleeve assembly. The distal portion of the sleeve assembly is rotatable relative to the proximal portion of the sleeve assembly about the axis, and the distal portion of the puller shaft assembly is rotatable relative to the proximal portion of the puller shaft about the axis. The distal portions of the sleeve assembly and the puller shaft assembly are simultaneously rotatable about the axis repeatedly without changing the stroke length of the tool.

The adapter may further comprise a friction device for providing controlled rotation of the distal portion of the adapter sleeve assembly about the axis. The friction device may selected from single wave spring washers and multiple wave spring washers. The sleeve assembly may be mateable with the outer portion of the tool and/or the outer portion of the pulling head via screw threads. Also, the puller shaft assembly may mateable with the puller shaft of the tool and/or the draw bolt of the pulling head via screw threads. The sleeve assembly may further comprise a cap nut for holding the distal portion of the sleeve assembly adjacent the proximal portion of the sleeve assembly. The sleeve assembly and the puller shaft assembly are preferably operative to transmit forces to the pulling head sufficient for installing metal fasteners to the pulling head. The forces may be compressive and tensile forces up to about 12,000 pounds per square inch. The adapter may include a through hole in the sleeve assembly alignable with an opening in the puller shaft assembly.

BRIEF DESCRIPTION OF THE DRAWINGS

These and other features, aspects, and advantages of the present invention will become better understood with reference to the following description, appended claims, and accompanying drawings, where:

DESCRIPTION

The present invention comprises an adapter for joining a pulling head to a fastener installation tool or pulling tool. The adapter has a puller shaft and a sleeve that are rotatable relative to each other about a longitudinal axis, allowing the attached pulling head to be rotated relative to the installation tool without disturbing the axial range of motion of either the pulling tool or the pulling head relative to one another. Both the tool and the pulling head are affected by the range of motion of their component parts. If the threaded components are not in their proper relationship, either the tool, the pulling head, or both will be out of adjustment, thus affecting the range of motion of the assembly.

A friction device within the present invention allows a user to rapidly position or reposition the pulling head as desired and then holds the pulling head in that desired position until the fastener installation is complete. The friction device within the present invention is capable of holding the attached pulling head in any position set by the user, without the user having to hold the pulling head in position. As a result, fasteners can be installed using a single hand by the user to operate the pulling tool, while his free hand can hold the work piece, which is often required. The adapter can be used with commercially available and commonly used installation tools, tool extensions, and pulling heads that require rotational positioning relative to the tool. Such heads include offset pulling heads, angled pulling heads, chisel point pulling heads, and other straight pulling heads.

In the following discussion, the terms "proximal" and "distal" are used with reference to the pulling tool to which the adapter would be attached. "Proximal" refers to the portion of the adapter or adapter component closest to the tool, and "distal" refers to the portion of the adapter or adapter component farthest from the tool.

Figure 1:
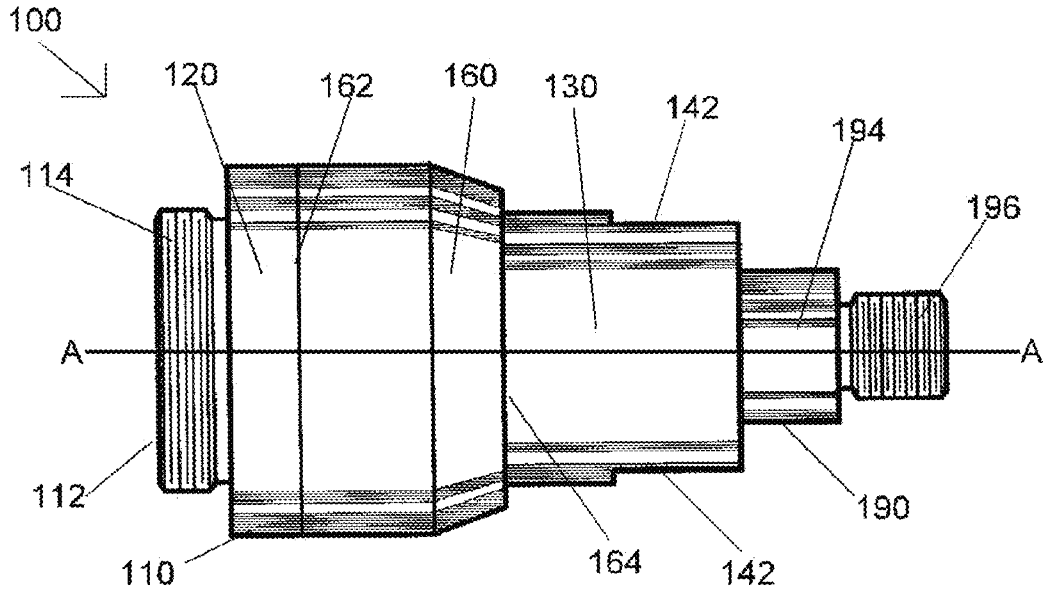
FIG. 1 is a side view of one embodiment of a rotating adapter in accordance with the present invention.
Figure 2:
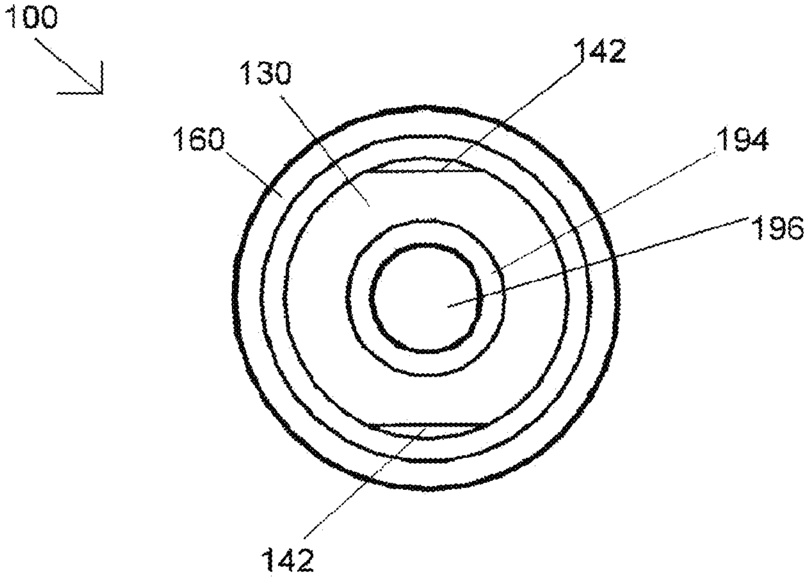
FIG. 2 is a view of the adapter of FIG. 1 from the end that attaches to a pulling head.
Figure 3:
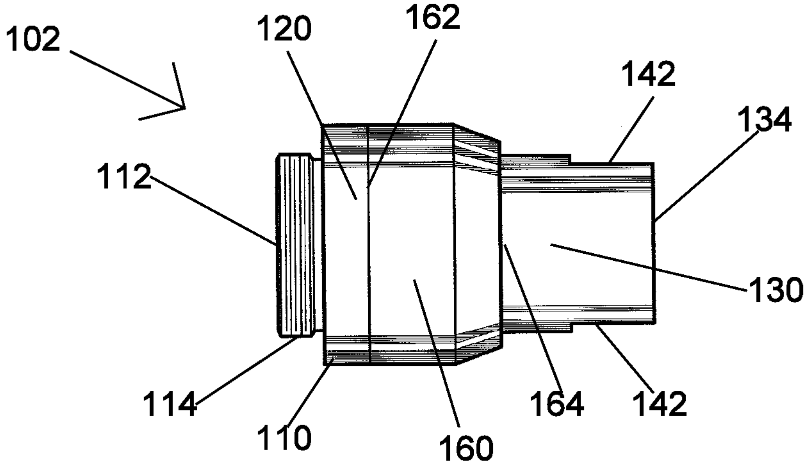
FIG. 3 is a side view of the rotating sleeve assembly of the adapter of FIG. 1.
Figure 4:
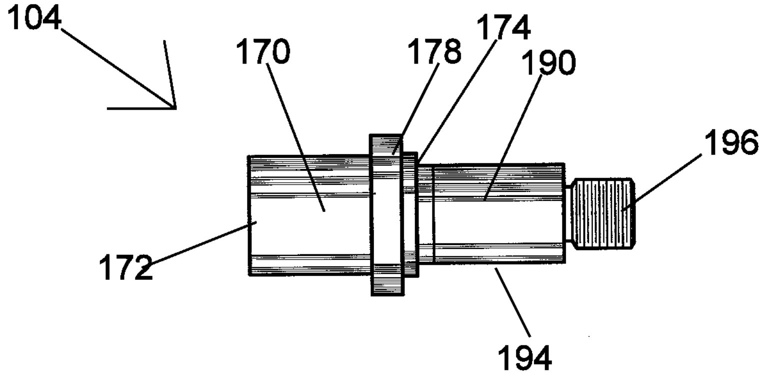
FIG. 4 is a side view of the puller shaft assembly of the rotating adapter of FIG. 1.
Figure 5:
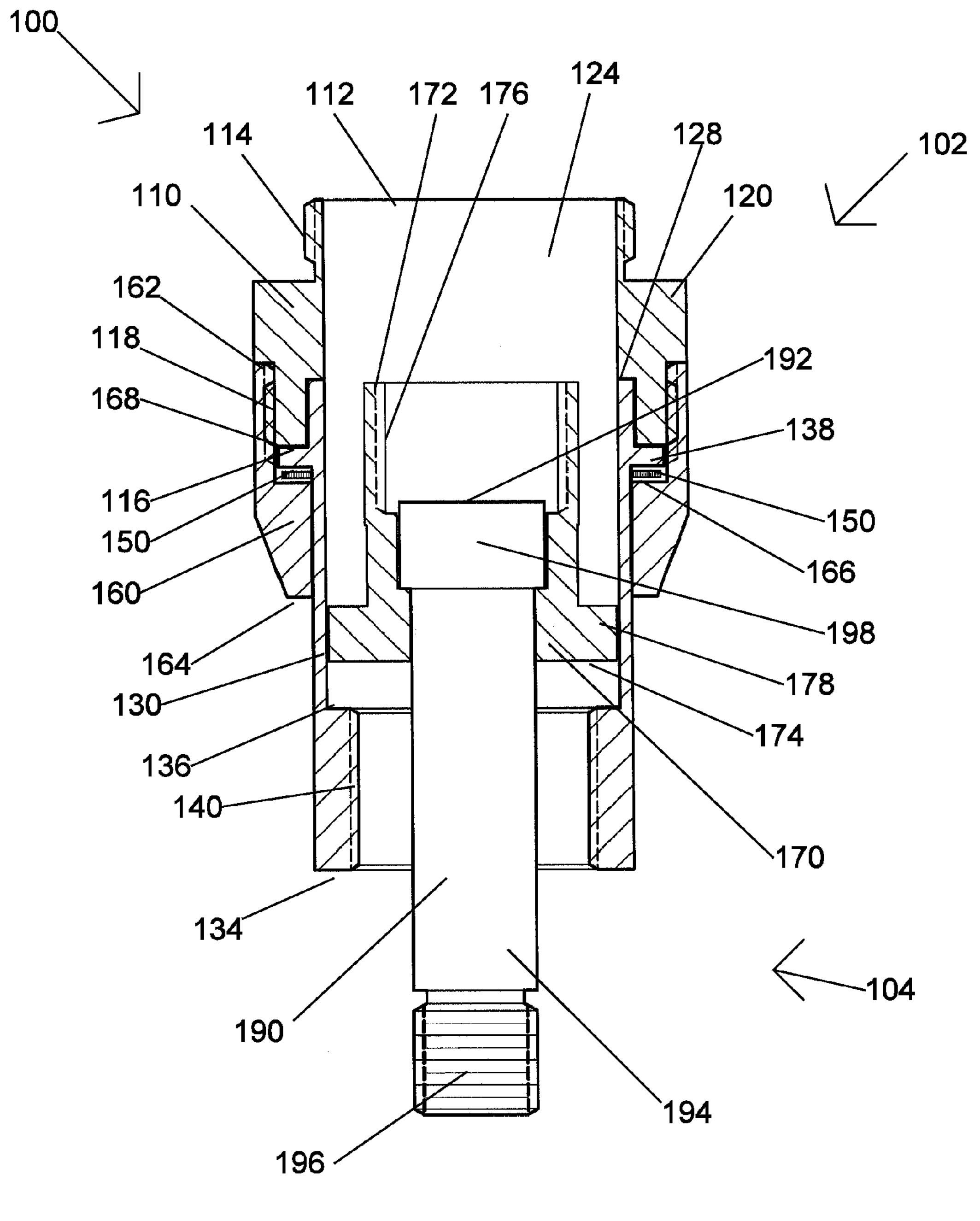
FIG. 5 is a partial cross sectional view of the rotating adapter of FIG. 1 along line A-A.
Figure 6:
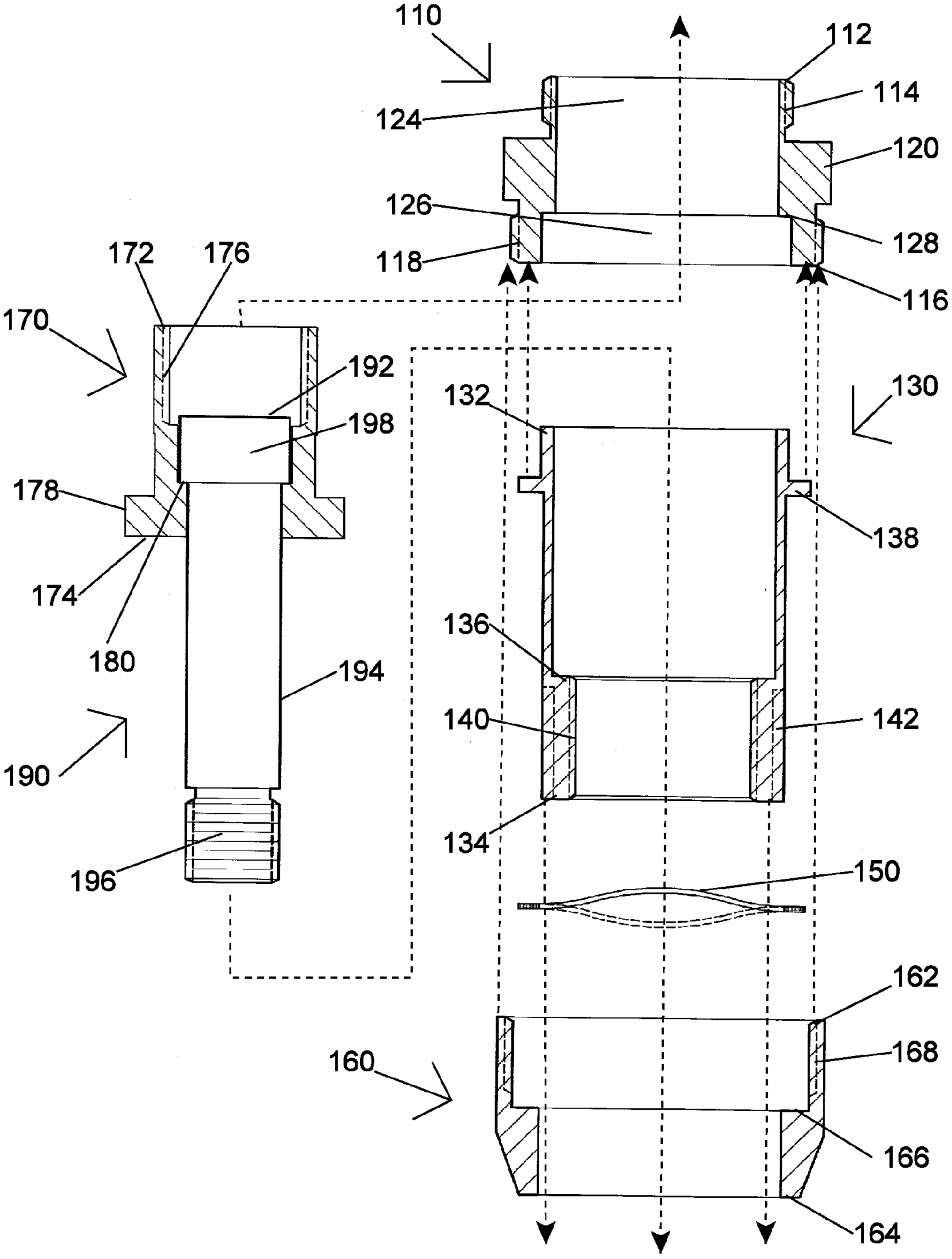
FIG. 6 is an exploded partial cross sectional view along line A_A of the rotating adapter of FIG. 1.

Referring to FIGS. 1-6, one embodiment of the rotating adapter 100 comprises an outer rotating sleeve assembly 102 (FIG. 3) and a puller shaft assembly 104 (FIG. 4) disposed within and concentric with the sleeve about a longitudinal axis. Rotating sleeve 102 has a base 110 with a proximal end 112 with external screw threads 114 for joining the sleeve to the outer portion of a pulling tool (not shown). The distal end 116 (FIGS. 5 & 6) also has external screw threads 118. A base flange 120 is between the screw threads 114 and 118. The interior portion 120 has a smaller inner diameter portion 124 adjacent the proximal end 112 and a larger inner diameter portion 126 adjacent the distal end 116, with a shoulder 128 between the narrower and wider portions 124 and 126. Adapter 100 is suitable for use with CherryMax® pulling tools and heads.

Rotating adapter sleeve 130 has a proximal end 132 with an outer diameter sized to fit inside the distal end portion 126 of the outer sleeve base 110, a distal end 134 with a smaller internal diameter, and a shoulder 136 stepping the internal diameter between the proximal and distal ends. Shoulder 136 has a reduced inside diameter to accommodate the threads on Cherry Max pulling heads that are attached to the distal end 134 of the sleeve assembly. External flange 138 is positioned between proximal end 132 and distal end 134. Distal end 134 has internal screw threads 140 for engagement with the outer sleeve of a Cherry Max pulling head (not shown). Sleeve 130 also has flat portions 142 on its exterior surface to provide for engagement with a wrench or similar tool to install the pulling head onto the sleeve assembly.

A friction device 150 fits around the distal exterior of sleeve 130 and is positioned against external flange 138, located between proximal end 132 and distal end 134 of the sleeve. The friction device 150 is preferably a multiple wave washer. More preferably, the friction device is a 3-wave washer having a load rate sufficient for the friction requirement.

Rotating adapter cap nut 160 has a proximal end 162 and a distal end 164, with a shoulder 166 stepping between a larger inner diameter adjacent proximal end 162 and a smaller inner diameter adjacent distal end 164. Internal screw threads 168 adjacent proximal end 162 are mateable with external screw threads 118 on the base 110. With screw threads 168 and 118 mated, adapter sleeve is held between base 110 and cap nut 160, and wave washer is held between shoulder 166 and flange 138.

Puller shaft holder 170 has a proximal end 172 and a distal end 174. Internal screw threads 176 adjacent proximal end 172 mate with a puller shaft of a pulling tool (not shown). Shaft holder 170 also has a flange 178, sized to fit within the wider internal diameter proximal portion of adapter sleeve 130, and an internal shoulder 180.

Puller shaft 190 is slidable axially relative to shaft holder 170. Shaft 190 has a proximal end 192 sized to slide axially within shaft holder 170, with the motion stopped distally by internal shoulder 180. A central portion 194 extends distally outward from shaft holder 170 and terminates in an externally threaded portion 196. Threaded portion 196 is mateable with a pulling head drawbolt (not shown). Axial motion of puller shaft 190 relative to shaft holder 170 in the distal direction is limited when flange 198 adjacent proximal end 192 contacts shoulder 180 of the puller shaft holder 170.

To utilize rotating adapter 100, the puller shaft assembly 104 is first assembled. The distal end of puller shaft 190 is inserted into the proximal end of the puller shaft holder 170, such that the threaded portion 196 extends beyond the distal end 174 of the puller shaft holder 170. The combined puller shaft holder 170 and puller shaft 190 together make the puller shaft assembly 104, and are attached to the puller shaft of a pulling tool.

The sleeve assembly 102 is assembled by inserting the proximal end 132 of sleeve 130 into the distal end 116 of sleeve base 110, and then wave washer 150 is positioned over the distal end 134 of sleeve 130 and slid down against the distal face of flange 138 of sleeve 130. The adapter cap nut 160 can now be positioned over the distal end 134 of sleeve 130 and slid down toward wave washer 150, covering the washer with the larger inner diameter at the proximal end 162 until the shoulder 166 contacts the wave washer 150. At the same time, the internal threads 168 of the cap nut 160 will contact the external threads 118 at the distal end of sleeve base 110, and upon threading, the cap nut 160 will compress wave washer 150 against the distal face of flange 138 creating the desired friction for the designed operation of the rotating adapter assembly 100. Preferably, a commercially available thread locking formulation is used in securing the threads of cap nut 160 to the threads of sleeve base 110.

The sleeve assembly 102 is then placed over the puller shaft assembly 104 and threaded onto the exterior portion of the pulling tool. The resultant relationship between the distal end 196 of the puller shaft assembly 104 and the distal end 134 of the sleeve assembly 102 is dependent upon the design characteristics of the pulling head used in the completed assembly. Different pulling tools and different pulling heads being utilized with this present invention will determine the actual specifications required for each rotating adapter.

To attach a pulling head to the distal end of the adapter 100, the screw threads on the end of the draw bolt of the pulling head are mated with threaded portion 196 of puller shaft 190. Then the screw threads on the sleeve assembly of the pulling head are mated with screw threads 140 of rotating adapter sleeve 130, using a wrench to engage flat portions 142 of the sleeve 130. Both connections must be sufficiently tight that more force will be required to overcome friction for the connections to loosen than the force required to overcome friction caused by the wave washer 150.

The rotating adapter of the present invention allows a user to lock both the draw bolt and the external portion of a pulling head to the puller shaft and external portion of a pulling tool via the rotating adapter assembly, so that the stroke length of the pulling head and the pulling tool are adjusted optimally for fastener installation. During use, both the sleeve 130 and the puller shaft 190 are rotatable with one hand about the longitudinal axis without any motion at the mated screw threads, thus maintaining the stroke length. The friction device 150 maintains the pulling head orientation in whatever position it is set to. During use, the distal face of flange 138 and friction device 150 are held tightly together by the cap nut 160 being threaded tightly to threads 118 on the distal end 116 of sleeve base 110. A space between distal end 116 of sleeve base 110 and the proximal face of flange 138 is created because the length of the sleeve portion between the proximal face of flange 138 and the proximal end 132 of sleeve 130 is longer than larger diameter portion 126 at the distal end 116 of sleeve base 110. This feature allows for compressive forces applied to the assembly during operation to travel down the sleeve 130 and be transmitted to the sleeve base 110, and thus to the exterior portion of the pulling tool, without applying those forces to either the flange 138 or the friction device 150, which are not exposed to the forces required to install fasteners.

Adapter sleeve 130, by design of the present invention, is rotatable about the central axis to position any attached pulling head as desired relative to the tool, with friction device 150 preventing additional, undesired rotation in either direction. When puller shaft holder 170 is screwed onto the puller shaft of the pulling tool, puller shaft flange 198 is held against internal lip 180 of the shaft holder. The puller shaft assembly 104 slides axially within the adapter sleeve assembly 102 with the tool puller shaft, when the tool is actuated by the user. As the attached pulling head is positioned by the user, puller shaft 190 rotates about the axis relative to shaft holder 170 at the same rate that the adapter sleeve 130 rotates about the axis relative to the sleeve base 110.

Figure 8:
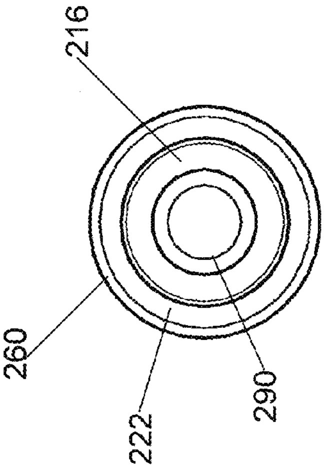
FIG. 8 is a view of the adapter of FIG. 7 from the end that attaches to a pulling head.
Figure 7:
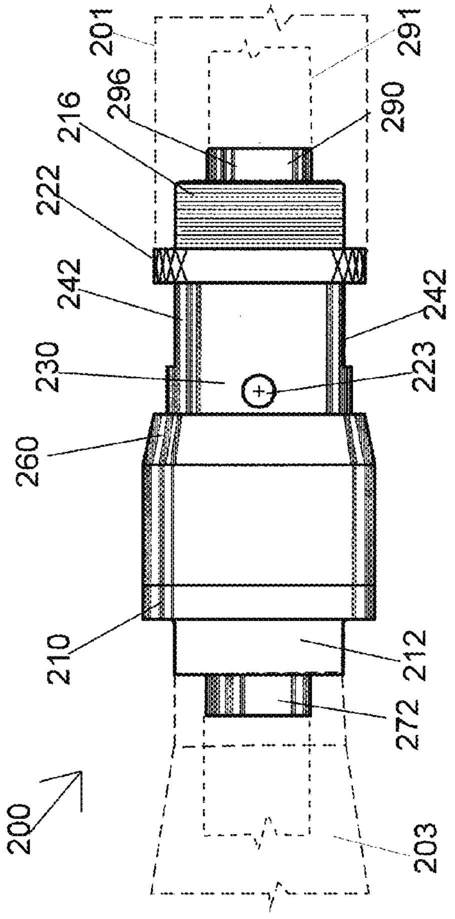
FIG. 7 is a side view of another embodiment of rotating adapter, attached to a pulling tool and a pulling head, in accordance with the present invention.
Figure 10:
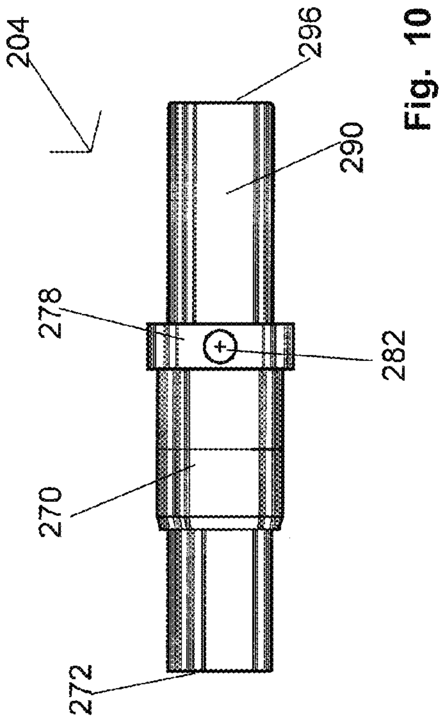
FIG. 10 is a side view of the puller shaft assembly of the rotating adapter of FIG. 7.
Figure 9:
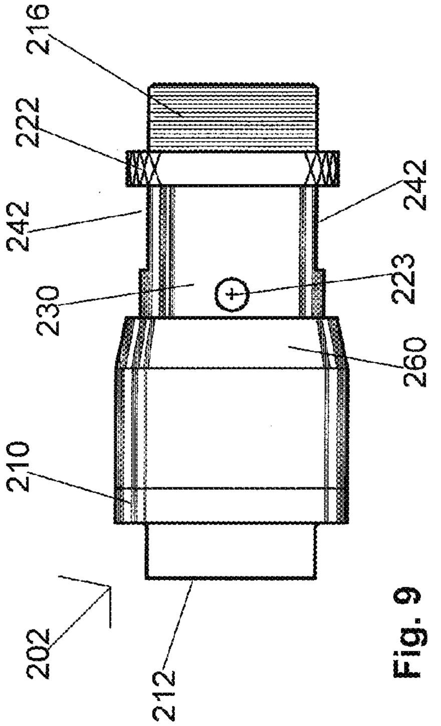
FIG. 9 is a side view of the rotating sleeve assembly of the adapter of FIG. 7.

Another embodiment of a rotating adapter 200 is shown in FIGS. 7-10. Adapter 200 is similar to adapter 100, except that it is suitable for use with Huck® pulling heads, such as pulling head 201 shown in dashed lines in FIG. 7, and pulling tools, such as pulling tool 203 shown in dashed lines in FIG. 7. Adapter 200 includes an outer sleeve assembly 202 and a puller shaft assembly 204.

Outer rotating sleeve assembly 202 includes a sleeve base 210, with an internally threaded proximal end 212 and an externally threaded distal end 216. Jam nut 222 adjacent distal end 216 is knurled to aid in securing a pulling head 201 to the sleeve assembly 200. Through hole 223 in rotating adapter sleeve 230 accommodates the end of a screw driver or other tool during attachment to a pulling tool or attachment of a pulling head. Flat portions 242 on adapter sleeve 230 accommodate a wrench or other tool.

Cap nut 260 secures sleeve 230 onto sleeve base 210. Puller shaft 290 is slidable axially inside puller shaft holder 270, like puller shaft 190 and puller shaft holder 170 in adapter 100. Distal end 296 of puller shaft 290 is internally threaded and mateable with the draw bolt 291 of pulling head 201. Proximal end 272 of shaft holder 270 is internally threaded for mating with the outer portion of a-pulling tool 203. Flange 278 on puller shaft holder 270 includes an opening 282 that is alignable with opening 223 in adapter sleeve 230.

Rotating adapter 200 can be assembled and mounted onto a pulling tool, such as tool 203, in the same manner as rotating adapter 100. To mount a pulling head, such as pulling head 201, onto the adapter, the outer portion of the pulling head is screwed onto the externally threaded distal end 216 of adapter sleeve 230. Puller shaft 290 is positioned so that holes 223 and 282 are aligned, and a screw driver, rivet stem, or other elongated tool is inserted into the holes to prevent relative rotation of the puller shaft and the adapter sleeve while the draw bolt 291 of the pulling head is screwed onto the internally threaded distal end 296 of puller shaft 290. The screw driver or other tool is removed, and the assembled pulling tool 203, adapter 200, and head 201 are ready for use to install fasteners.

Repositioning pulling heads on pulling tools is a constant requirement in aircraft production and maintenance. Because the present invention prevents the stroke length from changing during use of an installation tool and pulling head, an aircraft mechanic or artisan using the adapter can focus on the work that needs to be done, for example, aircraft assembly or maintenance, and does not need to develop expertise in or spend time maintaining installation tools or removing improperly installed fasteners. The rotating adapter in accordance with the present invention makes aircraft construction and maintenance operations more efficient, because the tools operate reliably without becoming damaged, and the fasteners are installed properly. In addition, workers who use the tools and pulling heads are less prone to repetitive use injuries from the frequent repositioning of the pulling head relative to the tool, because the workers don't constantly loosen and tighten parts.

The rotating adapter of the present invention can be used with any combination of pulling tool and pulling head, as long as the proximal and distal ends of the sleeve and pulling assemblies are adapted for the specific tool and pulling head. The adapter can also be used with or incorporated into any extension for increasing the distance between the pulling tool and the pulling head.

The adapter may be formed from any material having suitable properties for formability, operation, and durability. Preferably, the material is an alloy suited to the design parameters. The outer sleeve assembly and the puller shaft assembly should be operative under forces commonly used to install fasteners used in aircraft and other industrial applications. Preferably, the adapter is able to transfer compressive and tensile forces up to about 12,000 pounds per square inch.

All threaded connections must be sufficiently tight that more force will be required to overcome friction for the connections to loosen than the force required to overcome friction caused by the wave washer or other friction device retained between the sleeve and the cap nut.

The foregoing description is considered as illustrative only of the principles of the invention. Further, since numerous modifications and changes will readily occur to those skilled in the art, it is not desired to limit the invention to the exact construction and process shown and described above. Accordingly, all suitable modifications and equivalents may be resorted to falling within the scope of the invention.

What is claimed is:

1. An adapter for joining a pulling head to a fastener installation tool, wherein the tool includes an outer portion for applying compressive force and a puller shaft slidable axially and reciprocally within the outer portion for applying tensile force, and the pulling head includes an outer portion for applying compressive force to a workpiece and a draw bolt for applying tensile force to a fastener, with the draw bolt slidable axially and reciprocally over a stroke length within the outer portion; said adapter comprising:

a sleeve assembly having a proximal portion mateable with the outer portion of the fastener installation tool and a distal portion threadedly engageable with the outer portion of the pulling head; and a puller shaft assembly having a proximal portion mateable with the puller shaft of the fastener installation tool and a distal portion threadedly engageable with the draw bolt of the pulling head;

wherein:

said sleeve assembly and said puller shaft assembly share an axis;

said puller shaft assembly is slidable reciprocally along said axis within and relative to said sleeve assembly;

said distal portion of said sleeve assembly is rotatable relative to said proximal portion of said sleeve assembly about said axis;

said distal portion of said puller shaft assembly is rotatable relative to said proximal portion of said puller shaft about said axis; and said distal portions of said sleeve assembly and said puller shaft assembly are operative to allow simultaneous rotation about said axis repeatedly without changing the stroke length of the joined combination of the tool, said adapter, and the pulling head.

2. The adapter of claim 1, further comprising a friction device for providing controlled rotation of said distal portion of said adapter sleeve assembly about said axis.

3. The adapter of claim 2, wherein said friction device is selected from single wave spring washers and multiple wave spring washers.

4. The adapter of claim 1, wherein said sleeve assembly is mateable with at least one of the outer portion of the tool and the outer portion of the pulling head via screw threads.

5. The adapter of claim 1, wherein said puller shaft assembly is mateable with at least one of the puller shaft of the tool and the draw bolt of the pulling head via screw threads.

6. The adapter of claim 1, wherein said sleeve assembly comprises a cap nut for holding said distal portion of said sleeve assembly adjacent said proximal portion of said sleeve assembly.

7. The adapter of claim 1, wherein said sleeve assembly and said puller shaft assembly are operative to transmit forces to the pulling head sufficient for installing metal fasteners with the pulling head.

8. The adapter of claim 1, wherein said sleeve assembly and said puller shaft assembly are operative to transfer compressive and tensile forces up to about 12,000 pounds per square inch.

9. The adapter of claim 1, further including a through hole in said sleeve assembly alignable with an opening in said puller shaft assembly.

10. A system for installing fasteners, said system comprising:

a fastener installation tool, said tool comprising an outer portion for applying compressive force and a puller shaft slidable axially and reciprocally within the outer portion for applying tensile force; and an adapter comprising a sleeve assembly having a proximal portion mateable with the outer portion of the fastener installation tool and a distal portion threadedly engageable with the outer portion of a pulling head, said adapter also comprising a puller shaft assembly having a proximal portion mateable with the puller shaft of the fastener installation tool and a distal portion threadedly engageable with a draw bolt of the pulling head;

wherein:

said system has a stroke length;

said sleeve assembly and said puller shaft assembly share an axis;

said puller shaft assembly is slidable reciprocally along said axis within and relative to said sleeve assembly;

said distal portion of said sleeve assembly is rotatable relative to said proximal portion of said sleeve assembly about said axis;

said distal portion of said puller shaft assembly is rotatable relative to said proximal portion of said puller shaft about said axis; and when said proximal portion of said adapter puller shaft assembly is mated to puller shaft of said tool and said proximal portion of said adapter sleeve assembly is mated to said tool outer portion, said distal portions of said sleeve assembly and said puller shaft assembly are operative to allow simultaneous rotation about said axis repeatedly without changing said system stroke length.

11. The system of claim 10, further comprising a pulling head, wherein:

said pulling head comprises an outer portion for applying compressive force to a fastener in a workpiece and a draw bolt for applying tensile force to the fastener, with the draw bolt slidable axially and reciprocally over a stroke length within the outer portion;

said pulling head has a stroke length; and when said distal portion of said adapter puller shaft assembly is mated to said pulling head draw bolt and said distal portion of said adapter sleeve assembly is mated to said pulling head outer portion, said distal portions of said sleeve assembly and said puller shaft assembly are simultaneously rotatable about said axis repeatedly without changing said pulling head stroke length.

12. A system for installing fasteners, said system comprising:

a pulling head, said pulling head comprising an outer portion for applying compressive force to a fastener in a workpiece and a draw bolt for applying tensile force to the fastener, with the draw bolt slidable axially and reciprocally over a stroke length within the outer portion; and an adapter comprising a sleeve assembly having a proximal portion mateable with the outer portion of the fastener installation tool and a distal portion threadedly engageable with the outer portion of the pulling head, said adapter also comprising a puller shaft assembly having a proximal portion threadedly engageable with the puller shaft of the fastener installation tool and a distal portion mateable with the draw bolt of the pulling head;

wherein:

said system has a stroke length;

said sleeve assembly and said puller shaft assembly share an axis;

said puller shaft assembly is slidable reciprocally along said axis within and relative to said sleeve assembly;

said distal portion of said sleeve assembly is rotatable relative to said proximal portion of said sleeve assembly about said axis;

said distal portion of said puller shaft assembly is rotatable relative to said proximal portion of said puller shaft about said axis; and said distal portions of said sleeve assembly and said puller shaft assembly are operative to allow simultaneous rotation about said axis repeatedly without changing said system stroke length.

* * * * *